United States Patent
Tschanz

(10) Patent No.: US 12,050,312 B2
(45) Date of Patent: Jul. 30, 2024

(54) MICROMANIPULATION SYSTEM COMPRISING A PROTECTIVE SYSTEM FOR CAPILLARIES

(71) Applicant: MMI AG, Glattburgg (CH)

(72) Inventor: Peter Tschanz, Gerlikon (CH)

(73) Assignee: MMI AG, Glattburgg (CH)

( * ) Notice: Subject to any disclaimer, the term of this patent is extended or adjusted under 35 U.S.C. 154(b) by 690 days.

(21) Appl. No.: 16/920,158

(22) Filed: Jul. 2, 2020

(65) Prior Publication Data
US 2020/0333577 A1    Oct. 22, 2020

Related U.S. Application Data

(63) Continuation of application No. 13/641,261, filed as application No. PCT/EP2011/055694 on Apr. 12, 2011, now abandoned.

(30) Foreign Application Priority Data

Apr. 15, 2010    (EP) .................................... 10160011

(51) Int. Cl.
*G02B 21/32*    (2006.01)
*G01N 1/28*    (2006.01)

(52) U.S. Cl.
CPC ............. *G02B 21/32* (2013.01); *G01N 1/286* (2013.01)

(58) Field of Classification Search
CPC .... B01L 3/0237; B01L 3/0234; B01L 3/0231; B01L 3/0227; B01L 3/0224; B01L 3/022; G02B 21/32; G01N 1/286
See application file for complete search history.

(56) References Cited

U.S. PATENT DOCUMENTS

| | | | |
|---|---|---|---|
| 2,857,808 A | 10/1958 | Hastings | |
| 4,619,899 A * | 10/1986 | Nikitin | A61B 17/3476 604/176 |
| 5,662,617 A | 9/1997 | Odell et al. | |
| 5,890,863 A | 4/1999 | Yoneyama | |
| 6,050,153 A | 4/2000 | Yoneyama | |
| 6,190,616 B1 * | 2/2001 | Jovanovich | G02B 6/403 422/538 |
| 6,358,749 B1 | 3/2002 | Orthman | |
| 6,967,335 B1 | 11/2005 | Dyer | |

(Continued)

FOREIGN PATENT DOCUMENTS

| | | |
|---|---|---|
| DE | 19714987 C1 | 9/1998 |
| EP | 0022977 A1 | 1/1981 |

(Continued)

OTHER PUBLICATIONS

Communication from a Related Counterpart Application, Non-Final Office Action dated Nov. 16, 2015, U.S. Appl. No. 13/641,261.

(Continued)

*Primary Examiner* — Lynsey C Eiseman
*Assistant Examiner* — Amanda L Steinberg
(74) *Attorney, Agent, or Firm* — Conley Rose P.C.

(57) ABSTRACT

A manipulation system for microscope applications comprises a micromanipulation tool and a protective device protecting the tool, wherein the tool and the protective device are movable relative to one another between a position protecting the tool in a contactless manner and a position releasing the tool for the manipulation.

20 Claims, 3 Drawing Sheets

(56) References Cited

U.S. PATENT DOCUMENTS

| | | |
|---|---|---|
| 7,163,526 B2 | 1/2007 | Leong et al. |
| 7,204,792 B2* | 4/2007 | Hagihara ............ B23K 26/1482 |
| | | 483/66 |
| 7,316,668 B2 | 1/2008 | Swenson |
| 8,029,463 B2 | 10/2011 | Hauri |
| 8,251,961 B2 | 8/2012 | Hauri et al. |
| 2003/0057347 A1* | 3/2003 | Weiss .................... A61M 25/00 |
| | | 248/558 |
| 2003/0078548 A1 | 4/2003 | Kobayaski |
| 2003/0132109 A1* | 7/2003 | Bullen ............... G01N 33/5005 |
| | | 436/63 |
| 2006/0113794 A1 | 6/2006 | Plant et al. |
| 2006/0182606 A1 | 8/2006 | Mochizuki |
| 2013/0058751 A1 | 3/2013 | Tschanz |

FOREIGN PATENT DOCUMENTS

| | | |
|---|---|---|
| EP | 0292899 A2 | 11/1988 |
| EP | 0460914 A1 | 12/1991 |
| JP | 2001330781 A | 5/2000 |
| JP | 2004295146 A | 10/2004 |
| JP | 2007127974 A | 11/2005 |
| JP | 2009078324 A | 9/2007 |
| WO | 9928725 | 6/1999 |
| WO | 0132244 A1 | 5/2001 |
| WO | 03030961 A2 | 4/2003 |
| WO | 2005035029 A1 | 4/2005 |

OTHER PUBLICATIONS

Communication from a Related Counterpart Application, Final Office Action dated Mar. 30, 2016, U.S. Appl. No. 13/641,261.
Communication from a Related Counterpart Application, Advisory Action dated Jul. 29, 2016, U.S. Appl. No. 13/641,261.
Communication from a Related Counterpart Application, Non-Final Office Action dated Nov. 10, 2016, U.S. Appl. No. 13/641,261.
Communication from a Related Counterpart Application, Final Office Action dated Apr. 25, 2017, U.S. Appl. No. 13/641,261.
Communication from a Related Counterpart Application, Advisory Action dated Aug. 18, 2017, U.S. Appl. No. 13/641,261.
Communication from a Related Counterpart Application, Non-Final Office Action dated Sep. 26, 2017, U.S. Appl. No. 13/641,261.
Communication from a Related Counterpart Application, Final Office Action dated Jun. 27, 2018, U.S. Appl. No. 13/641,261.
Communication from a Related Counterpart Application, Advisory Action dated Dec. 10, 2018, U.S. Appl. No. 13/641,261.
Communication from a Related Counterpart Application, Non-Final Office Action dated Jul. 25, 2019, U.S. Appl. No. 13/641,261.
Communication from a Related Counterpart Application, Final Office Action dated Feb. 5, 2020, U.S. Appl. No. 13/641,261.

* cited by examiner

MICROMANIPULATION SYSTEM COMPRISING A PROTECTIVE SYSTEM FOR CAPILLARIES

CROSS REFERENCE TO RELATED APPLICATIONS

This application is a continuation under 35 U.S.C. § 120 of U.S. application Ser. No. 13/641,261 which is a national phase filing under 35 U.S.C. § 371 of PCT/EP2011/055694 filed under the Patent Cooperation Treaty on Apr. 12, 2011, which claims priority to and benefit of foreign application EP 10160011.2, filed on Apr. 15, 2010, the contents of each being hereby incorporated by reference in their entirety.

SUMMARY

The present invention relates to a manipulation system for microscope applications, in particular a manipulation system with a protective device for capillaries used in the micromanipulation of biological material.

PRIOR ART

The molecular analysis of pure enriched cell cultures or even individual cells is an important prerequisite of medical genomics and proteomics, and could become extremely important in the future for medical profiling of patients. Hitherto this objective could be achieved only with difficulty and took a not inconsiderable amount of time on account of mechanical and also process technology restrictions in the cell manipulation (e.g. the cell collection or microinjection). In particular the isolation of individual as well as unusual cells from minute samples that is necessary for the genotype and phenotype characterization proved to be very difficult, since individual cells had to be detected under a microscope by research staff and the detected cell then had to be manipulated manually with the aid of capillaries. For this purpose it is necessary to move an accurately defined fluid volume in the capillaries, for example in order to extract individual cells or cell contents via the capillary, or to inject constituents of other cells (for example cell nuclei) into a cell, without at the same time damaging the cell due to too much aspirated or injected material.

Also, depending on the nature of the cells (for example the size of the material to be collected) different manipulation tools, such as for example capillaries, have to be used and accordingly the capillaries have to be changed. Even if one type of capillary is used, this must be cleaned at regular intervals and therefore also removed from the micromanipulation system. Finally, it may also become necessary to have free access to the biological sample during the cell manipulation, for which purpose the manipulation tool has to be removed from the working area.

However, all these procedures suffer from the inherent danger that the micromanipulation tool will be damaged during its displacement or the user will be injured by the tool. In particular fragile capillaries suffer from this danger as manipulation tools.

In the prior art micromanipulation systems are hitherto known in which the manipulation tool can be unscrewed in order to replace it, although it is otherwise unprotected. A general problem therefore arises in that after installing the tool the micromanipulation system has to be recalibrated once more. A method for microinjection in cells and for the aspiration of individual cell parts or whole cell structures is known from EP 0 292 899 A1, in which the capillary is fixed in a swivelable capillary holder and an axial movement of the capillary is performed to puncture the cells. Neither in the movement away from the working area nor in the event of a possible change of capillary are the capillary or the user protected. From EP 0 229 204 A1 a cannula protective cap is known, which comprises notched grooves on the needle attachment piece which respectively correspond to a non-sealing and a sealing position and in which the needle attachment piece can lockingly engage with a protuberance. From EP 0 434 008 A1 a similar protective device is known, this time for an injection needle, which is slipped over the injection needle, wherein the needle should engage in a hook-like manner in a bore of the protective device and thereby fix the protective device. With both these protective caps there is the problem that a mechanical load is exerted on the cannula and the injection needle, which in the case of molecular tools such as for example capillaries could lead to their breakage, and therefore they cannot be used for such purposes.

DESCRIPTION OF THE INVENTION

Accordingly, it is an object of the present invention to develop a micromanipulation system whose manipulation tool can be moved from its working area and in doing so is protected against damage or destruction, and at the same time injury to the user is excluded. Also the manipulation tool should be able to be returned as accurately as possible to its working position. This object is achieved by means of a manipulation system for microscope applications with the features of the following claim 1. Preferred embodiments of the manipulation system for microscope applications are defined in the dependent claims.

According to the present invention a manipulation system for microscope applications is thus provided, which comprises a micromanipulation tool and a protective device protecting the tool, wherein the tool and the protective device can be moved relative to one another between a position protecting the tool in a contactless manner, and a position releasing the tool for manipulation. In this way on the one hand a simpler capillary replacement can be carried out, and on the other hand the tool is protected against damage and also the user is protected against injury. The protective device does not contact the tool in the protecting position, which is of great importance in particular for very sensitive micromanipulation tools such as capillaries.

In this connection, the manipulation device is preferably mounted on a tool holder receiving the tool. The protective device can thereby be provided very close to the tool and can thus be moved reliably and quickly from the position releasing the tool for manipulation, into the position protecting the tool in a contactless manner.

In this connection it is advantageous if the tool is fixed to the tool holder with a clamping member whose diameter is greater than that of the tool, and the internal diameter of the protective device is substantially equal to or greater than the diameter of the clamping member. In this way freedom from contact in the protecting position can be ensured in a simple manner, since there is always sufficient safety space between the tool and the inner wall of the protective device.

It is preferred in this connection if the tool is fixed to the tool holder with a clamping member and the protective device can lockingly engage on the clamping member. This can be effected if the protective device has a section formed in a complementary (matching) manner to the outer surface of the clamping member. Particularly preferably in this connection the outer surface of the clamping member comprises nut-like flat portions with a width across flats, wherein a region of the protective device is formed corresponding to this width across flats. In this way the tool can be released quickly and simply from the holder, whereby the region of the protective device provided with the corresponding width across flats can be arranged on the distal or proximal end, so as to be able to remove the tool when the protective device is slipped over or removed.

In a preferred embodiment of the present invention the protective device can be displaced on the longitudinal axis of the tool in a contactless manner over the tool. In this way it is possible to simply and quickly accommodate the tool in the protective sleeve and to protect the tool against damage and the user against injury. Also, the installation space of the manipulation system is practically not altered thereby.

In this connection it is preferred if the protective sleeve has a rear wall with an opening in the axial direction of the tool, via which the protective device is guided on the longitudinal axis of the tool, in particular along the tool holder. It is thereby ensured at each stage of the movement of the protective device relative to the tool that no contact can occur between the tool and protective device and therefore the tool remains effectively protected also during the movement.

According to another embodiment of the present invention the protective device is a protective sleeve that is contactlessly foldable over the tool. In this connection the folding movement is a movement substantially perpendicular to the tool, in other words the protective tool is not moved substantially axially with respect to the tool, but perpendicularly to its longitudinal axis. Due to this implementation an effective protection of the tool can be ensured with little effort when the tool is removed from the working area, since for example the protective device can be incorporated in the micromanipulation system corresponding to the movement of the tool also in the course of the retro-fitting. This solution can be implemented in particular very cost-effectively.

Preferably in this connection the protective device is mounted via a horizontal hinge pin on the tool holder. This solution, just like the solution with the displaceable protective device, allows the protective device to be slipped particularly quickly over the tool and thus provides almost immediate protection as and when necessary.

Here, in a further preferred embodiment the protective device is rotatably mounted on a carrier arm about a horizontal axis and can be slipped over the tool by moving the carrier arm. This embodiment is suitable in particular for situations in which no protective devices can be mounted on the tool holder itself, and thus provides a reliable and cost-effective protection for the tool as well as the user. Also, due to the structural separation of the protective device from the tool and from the tool holder, a movement of the protective device independently of tool adjustment (displacement) is possible, so that the protective device, when not in use (in other words when the tool is being used), is situated outside the working area of the microscope and therefore cannot interfere with the sample manipulation.

In a particularly preferred embodiment the manipulation system of the invention furthermore comprises a swivel arm that can swivel about a horizontal rotation axis, on whose end remote from the rotation axis is provided a tool adjustment device movable along three orthogonal working axes, on which the tool is swivelably mounted about a tool axis parallel to the rotation axis. The advantages of these implementations are in particular that the tool can be removed with the aid of a swiveling movement together with the working axes from the working area, whereby due to the implementation with parallel horizontal rotation axis and tool axis the tool lifts off from the sample during the swiveling movement and is moved away in a flat arc over the working area. It would also be conceivable in this connection to coordinate the swiveling movement of the swivel arm as well as the rotation of the tool about the tool axis, in order to optimize the flat arcuate trajectory of the tool. Due to the tilting away and swiveling movement that are hereby rendered possible, the working area is freed for other processing steps or tools and at the same time the risk of injury to the user is reduced. Furthermore, it is possible to coordinate the vertical and rotational movement of the tool so that the tool that has been tilted or swiveled away is arranged head first, which facilitates the handling of liquids. At the same time, due to the retention of the alignment of the tool adjustment the manipulation tool can be returned again to the initial position over the sample, whereby a renewed calibration can be minimized. This contributes not insignificantly to the user friendliness.

In an alternative preferred embodiment the manipulation system furthermore comprises a tool adjustment movable along three orthogonal working axes, on one end of which is swivelably mounted a swivel arm about a horizontal rotation axis, on whose end remote from the rotation axis the tool is swivelably mounted about a tool axis parallel to the rotation axis. The advantage of this embodiment is that in order to remove the tool from the working area, the swivel arm simply has to be swiveled about the horizontal rotation axis, without the tool adjustment being moved at the same time. Here too it is again possible by coordinating the swiveling movement of the swivel arm and the rotation of the tool about its tool axis to obtain a very flat arcuate movement over and away from the working surface.

In this connection it is preferred if the protective device is arranged fixed relative to the tool adjustment and to the rotation axis of the swivel arm. In this way it becomes possible when swiveling out the swivel arm to tilt the tool directly into the protective device, so that the working area can be freed in a simple way.

In an advantageous embodiment the tool adjustment with the working axes is arranged in a suspended manner. As a general rule the linear axes are located on or over the microscope stage, since there is no accommodation space for the linear axes underneath the microscope stage. To move the stage in the X-direction space is therefore additionally required on the side. Due to the suspended arrangement over the sample the operational freedom over the working area can be increased and an almost horizontal movement (along a very flat arc) of the tool into and from the working area can be achieved.

Finally, it is advantageous if the protective device can be moved manually or automatically, wherein for this purpose it can be moved either by means of a mechanical, hydraulic or a pneumatic drive, or a combination of these drives. Maintenance operations and tool replacement procedures can therefore also be fully automated and carried out without the intervention of the user.

The present invention thus not only permits a quicker and more efficient operation in the exchange of capillaries, installation or maintenance, but also provides an increase in the working space on account of the flat tool guidance, a reduction in weight as well as in installation space, an increase in reliability on account of the simple structure of the manipulation system, and thus a reduction of the associated costs. To all this is added a significant improvement in the safety of the system, which effectively prevents damage to the micromanipulation tool and drastically reduces the danger of injury to the user.

WAYS OF IMPLEMENTING THE INVENTION

Preferred embodiments of the present invention are described hereinafter with reference to the drawings. First of all, for a better understanding of the field of use of the invention the automated isolation of arbitrary individual or unusual cells is described, which takes place in three stages: cell recognition, cell collection and cell release.

The inventors have for this purpose developed a system that is based on a reverse microscope (inverted microscope), a cell recognition unit, an automated capillary adjustment, an automated pump and a sliding table. The collection and release are controlled by means of a high-precision pump, which enables process procedures to be specified that employ nanolitre volumes of a pump medium for the separation process of the cell and thus provide the basis for a molecular analysis of the cell material to be carried out at the end of the process in just 1 microlitre of medium.

The (non-adhering) cells thus do not experience any kind of mechanical stresses: the cell collection takes place simply on account of the liquid flow surrounding the cell. Under optimal conditions even partly adhering cells can be collected in this way. There is no contact between the cells and the capillary used for the collection. The capillary diameter can be significantly larger than that of the cell. For example, cells of 6 µm diameter can be collected efficiently with a capillary of 40 µm diameter.

The cells can be released to various target carriers (deposits). So-called "grid deposits" are in this connection either grid-like point deposits (such as for example AmpliGrid®) or small vessels arranged in the manner of a grid (such as the IBIDI sample pocket object carrier). Individual point deposits can consist of a transparent cover, a PCR test tube or a microfluid device. In whatever way the target carrier is formed, its size should in general not exceed the size of standard object carriers, so that these can be used if the object carriers are multiply held on the sliding table.

The collection and release of the cells can take place in various ways, ranging from the manual to the fully automated mode of operation with cell recognition. However, even with the manual mode of operation it is not necessary to operate any components of the system (microscope, pump, capillary) by hand: all operating procedures are started by the user from a PC.

Figure 1:
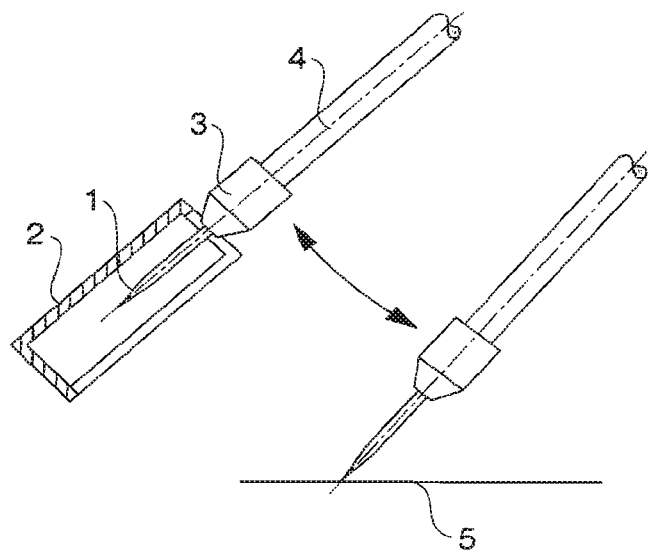
FIG. 1 is a schematic sectional view of a manipulation system for microscope applications, in which the manipulation tool can be folded into the protective device.

Embodiment examples of the manipulation system according to the invention are described hereinafter with the aid the figures. In FIG. 1 a capillary 1 is first of all generally represented as a micromanipulation tool, which is fixed by means of a clamping nut 3 as clamping member to a holder 4 comprising a corresponding screw thread. Alternatively the clamping member, instead of being realized by the clamping nut 3, can also be realized by a clamping sleeve (not shown) with a fixing screw, wherein the holder then has to be provided with a thread. The holder is fixed to a further (not shown) triple-axis or multiaxis displacement device, by means of which the capillary can be moved over the sample and lowered for the manipulation, so that the tip of the capillary lies in a working plane 5. Typical capillary diameters are in the range from 100 µm or less (for example capillaries with a diameter of 40 µm to receive individual cells of order of magnitude less than 100 µm), and are therefore very susceptible to damage. At the same time capillaries made of glass can, if carelessly handled, injure the user. For this reason, as is indicated in FIG. 1 by the arrow, the capillary can be moved from the working plane, in which the manipulation is performed, into a protective position, in which the capillary 1 is protected by a sleeve-like protection 2 against damage and injury to the user. In this connection the sleeve-like protection 2 does not come into contact with the capillary 1.

Figure 2:
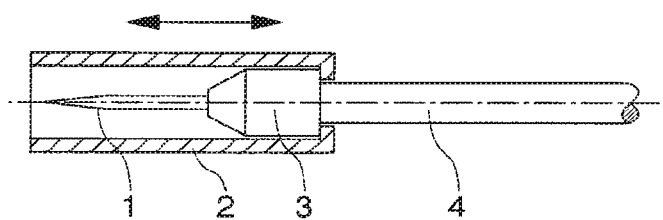
FIG. 2 is an alternative embodiment to FIG. 1, in which the protective device is displaceably arranged on the tool holder.

FIG. 2 shows an alternative configuration of the manipulation system of the invention, in which a protective sleeve 2 is displacably mounted on the longitudinal axis of the tool on the tool holder 4. The sleeve 2 is in this connection open to the side of the capillary tip and has in the opposite end wall an opening, which surrounds the capillary holder 4 so that this guides the sleeve reliably in the axial direction. The internal diameter of the sleeve 2 can in this connection be chosen so that it is slightly larger than the external diameter of the clamping nut 3 fixing the capillary 1 in the holder 4, so that they fit one another in such a way as to allow an axial displacement. In use the protective sleeve 2 can thus be displaced in a simple and quick manner onto the capillary 1 (contactless protecting position) or can be withdrawn from the capillary 1 (position freeing the manipulation).

Figure 3:
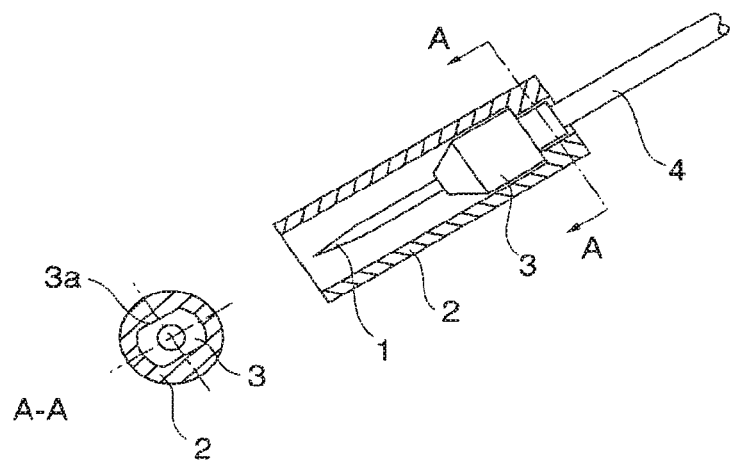
FIG. 3 shows a further embodiment of the manipulation system, in which the protective device can lockingly engage on a clamping nut fixing the tool to the holder, a section along the line A-A being shown in the left-hand part of the figure.

FIG. 3 shows an embodiment of the protective sleeve 2, in which this can lockingly engage on the clamping nut 3 (clamping member) of the tool. In this case the outside of the clamping nut is, as shown in the left-hand part of the figure, provided with two oppositely facing flat portions 3a, and the width across flats of the clamping nut 3 thereby formed is also correspondingly formed in the distal opening of the end wall of the protective sleeve. In this way the protective sleeve can be used as a key, by means of which the clamping nut 3, and thus the capillary 1, can be unscrewed from the capillary holder 4. In this connection the capillary always remains covered and protected by the protective sleeve.

Figure 4:
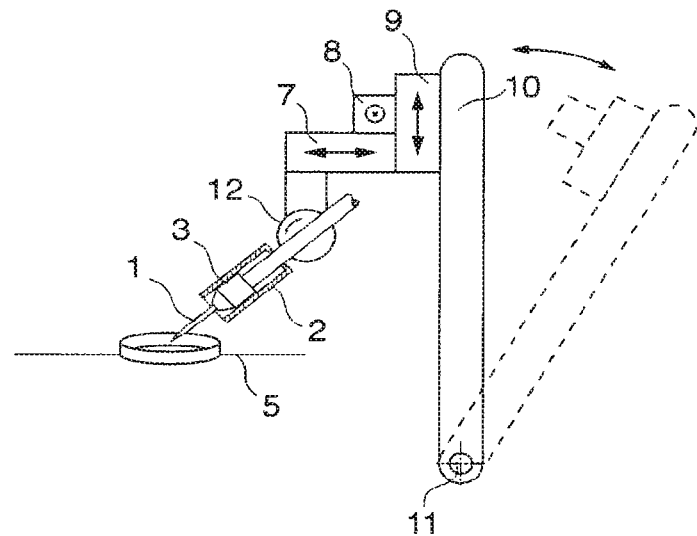
FIG. 4 shows a schematic view of an embodiment of the micromanipulation system of the present invention, in which the manipulation tool together with its adjustment drive can be swiveled into or out of the working area.

FIG. 4 shows an embodiment of the manipulation system according to the invention in which the manipulation tool can be removed from the sample in a flat arcuate movement over the working plane. The already described capillary 1 is in this case surrounded by a protective sleeve 2, as has been illustrated for example in FIG. 2, which is displacably arranged on the tool holder 4. The tool holder 4 itself is rotatably mounted on a triple-axis adjustment device over a tool axis 12 in a vertical plane perpendicular to the working plane 5, by means of which the capillary can be moved along the X-axis 7 and the Y-axis 8 parallel to the working plane 5 and also in the vertical Z direction 9. The aforementioned arrangement is fixed to one end of a swivel arm 10, which is swivelably mounted at its other end via a horizontal rotation axis 11. In order to remove the capillary 1 from the sample, in other words from the working plane 5, the swivel arm 10 is swiveled about the rotation axis 11. The rotation axis 11 is in this connection suitably disposed at such a distance underneath the working plane 5 that the opposite end of the swivel arm, to which the adjustment device 7, 8, 9 and the capillary 1 are secured with the clamping nut 3 and holder 4, is moved away in as flat an arc as possible from the working area in the plane 5. In other words, the end of the swivel arm 10 opposite the rotation axis 11 simply traverses the upper part of the circle that is described by the aforementioned end in a complete rotation about the rotation axis 11. The tool holder 4 can in this connection either remain fixed relative to the swivel arm 10, or alternatively can be suitably synchronized with the swiveling movement about the axis 11. In the first case therefore neither is the adjustment device 7, 8, 9 actuated, nor does a rotation about the tool axis 12 take place, so that when the swivel arm 10 is swiveled back the capillary 1 is located again in exactly the same position in relation to the sample. A complicated calibration or readjustment is therefore not necessary. If when swiveling the swivel arm 10 the tool holder 4 is rotated about the axis 12, the cannula 1 in the swiveled-out state (shown by dotted lines in FIG. 4) can be brought into a head first position, in which a handling of the liquid in the cannula or in the attached pump system can be performed particularly easily.

Figure 5:
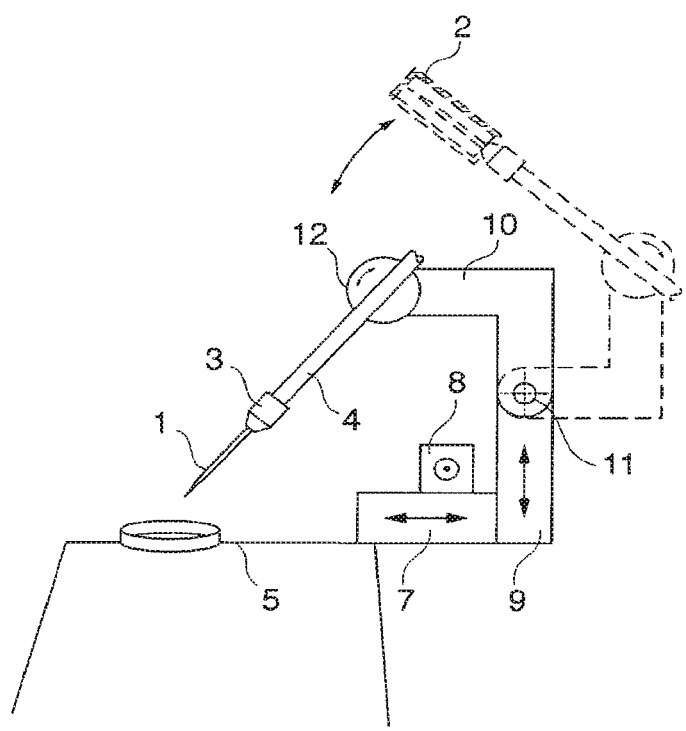
FIG. 5 shows an alternative preferred embodiment of the micromanipulation system, in which compared to FIG. 4 only the tool is swiveled out from the working area, while the tool adjustment device remains stationary.

FIG. 5 shows an alternative embodiment of the manipulation system for microscope applications, which differs from the embodiment in FIG. 4 in that now during the swiveling only the swivel arm rotates, but not the adjustment device 7, 8, 9, which remains stationary. In detail, the capillary 1 with its holder 4 is rotatably mounted as previously about a tool axis 12, which this time however passes horizontally through one end of a swivel arm 10. At the other end of the swivel arm 10, which in the present case is formed in the shape of an angle steel, it is swivelably mounted about a rotation axis 11 that passes horizontally through the adjustment device 7, 8, 9. In the restricted position (continuous line in FIG. 5) the capillary 1 is released, so as to manipulate the biological sample on the working plane 5, whereas in the swiveled-out position (shown by dotted lines in FIG. 5) it is inserted into a protective device 2, which protects the capillary 1 in a contactless manner against damage. For this purpose the protective device 2, for example a protective sleeve open on a lower side, can be fixed to the adjustment device, which remains stationary, preferably in a fixed relation to the rotation axis 11 (for example by fixing to the height adjustment device 9). In this embodiment example the adjustment device 7, 8, 9 is located on the microscope stage, wherein the position of the rotation axis 11 in this case too is as deep as possible, in other words is chosen to be as close as possible to the working plane 5, so that the swiveling out of the capillary 5 by means of the swivel arm 10 removes the capillary from the sample region in as flat an arc as possible over the working surface. It is however just as possible for the adjustment device also to be located underneath the microscope stage.

Figure 6:
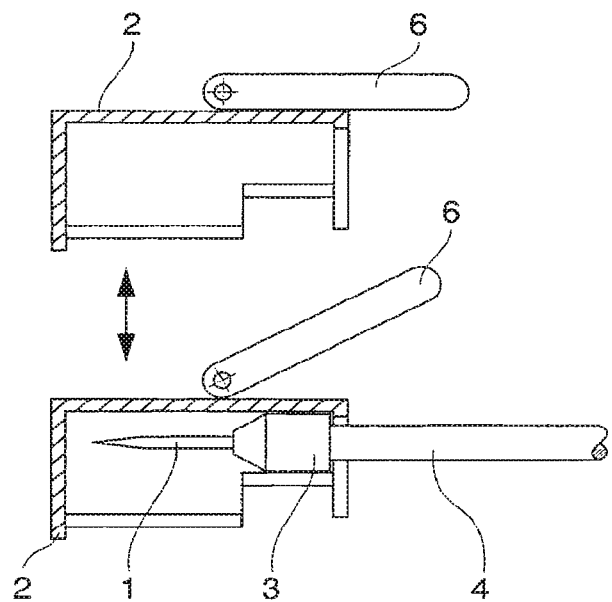
FIG. 6 is an embodiment of the manipulation system according to the invention, in which the protective device is swiveled onto the tool.

FIG. 6 shows a further modification of the manipulation system according to the invention, in which a protective device 2 is mounted on a carrier arm 6, which is moved independently of the capillary holder 4. The protective device 2 is in this connection swivelably fixed to the carrier arm via an axis, so that the protective device 2 can be swiveled correctly aligned onto the capillary 1. The protective device 2 is in this connection shaped so that it surrounds the capillary 1 together with the clamping nut 3 and protects them against damage. The protective sleeve 2 can thus be moved to or away from the tool, independently of adjustment movements of the tool 1 or of the tool holder 4. For example, this advance or reverse movement can take place synchronously or in a staggered manner with a horizontal swiveling of the swivel arm 10 (FIGS. 4 and 5).

Figure 7:
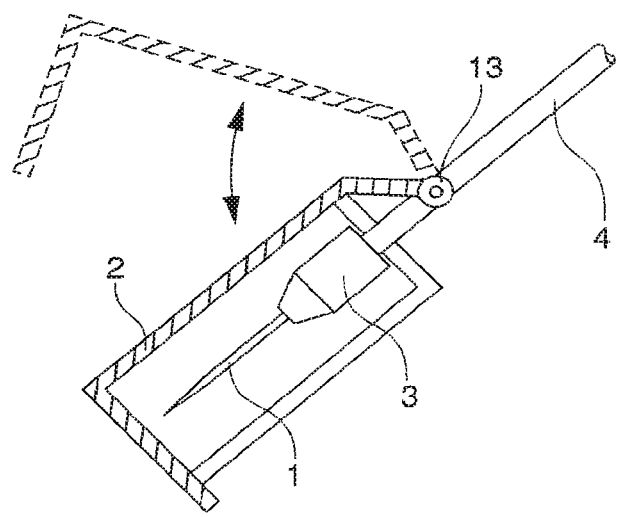
FIG. 7 is a schematic view of a further embodiment of the present invention, in which the protective device is fixed via a hinge pin to the tool holder.

Finally, FIG. 7 shows a further possible embodiment of the manipulation system according to the invention, in which the protective device 2 is simply fixed in a foldable manner to the tool holder 4 via a hinge pin 13. This particularly easily realizable configuration is characterized in particular by the speed with which the capillary 1 can be moved from the state allowing the manipulation, to a state protected against damage.

The invention claimed is:

1. A method for manipulating cells under a microscope, the method comprising:
    protecting a capillary against damage and destruction, and at the same time excluding injury to a user, by using a protective device in a position protecting the capillary, wherein the protective device does not contact the capillary in any position, wherein the capillary is mounted to a capillary holder with a clamping member, wherein the protective device is lockingly engaged on the clamping member in the position protecting the capillary;
    prior to cell manipulation, moving the protective device relative to the capillary from the position protecting the capillary, in which the protective device completely surrounds the capillary, to a position releasing the capillary for cell manipulation, in which the protective device is withdrawn from the capillary;
    collecting cells with the capillary while the protective device is in the position releasing the capillary for cell manipulation; and
    moving the protective device relative to the capillary from the position releasing the capillary for cell manipulation to the position protecting the capillary after collecting the cells.

2. The method of claim 1, further comprising:
    releasing the collected cells from the capillary while the protective device is in the position releasing the capillary for cell manipulation.

3. The method of claim 1, wherein a radially outer surface of the clamping member has flat portions with a width across flats, wherein a region of the protective device is formed corresponding to this width across flats, wherein the method further comprises:
    engaging the region of the protective device with the flat portions; and
    rotating the protective device;
        unscrewing the clamping member from the capillary holder based on rotating the protective device.

4. The method of claim 1, wherein moving the protective device relative to the capillary from the position protecting the capillary to the position releasing the capillary for cell manipulation comprises:

pushing the protective device over the capillary along a longitudinal axis of the capillary without contacting the capillary.

5. The method of claim 4, wherein the protective device comprises a rear wall with an opening in an axial direction of the capillary, and wherein moving the protective device relative to the capillary from the position protecting the capillary to the position releasing the capillary for cell manipulation further comprises:
guiding the protective device along the longitudinal axis of the capillary holder using the opening.

6. The method of claim 1, wherein the protective device is a protective sleeve, and wherein moving the protective device relative to the capillary from the position protecting the capillary to the position releasing the capillary for cell manipulation comprises:
folding the protective device from over the capillary between the position protecting the capillary to the position releasing the capillary for cell manipulation.

7. The method of claim 1, wherein the protective device is mounted on the capillary holder via a hinge pin.

8. The method of claim 1, wherein the protective device is rotatably mounted about a horizontal axis on a carrier arm, and wherein moving the protective device relative to the capillary from the position releasing the capillary for cell manipulation to the position protecting the capillary comprises:
slipping the protective device over the capillary by moving the carrier arm about the horizontal axis.

9. The method of claim 1, wherein the capillary is mounted on a capillary adjustment, wherein the capillary adjustment is provided on an end of a swivel arm remote from a horizontal rotation axis of rotation of the swivel arm, and wherein the capillary adjustment is movable along three orthogonal working axes.

10. A method for manipulating cells under a microscope, the method comprising:
protecting a capillary against damage and destruction, and at the same time excluding injury to a user, by using a protective device in a position protecting the capillary, wherein the capillary is part of a cell manipulation tool, wherein the protective device does not contact the capillary in any position, and wherein the capillary is mounted to a capillary holder;
prior to cell manipulation, moving the protective device relative to the capillary from the position protecting the capillary, in which the protective device completely surrounds the capillary, to a position releasing the capillary for cell manipulation;
collecting cells with the capillary while the protective device is in the position releasing the capillary for cell manipulation, in which the protective device is withdrawn from the capillary; and
moving the protective device relative to the capillary from the position releasing the capillary for cell manipulation to the position protecting the capillary after collecting the cells.

11. The method of claim 10, further comprising:
releasing the collected cells from the capillary while the protective device is in the position releasing the capillary for cell manipulation.

12. The method of claim 10, wherein the capillary is fixed to the capillary holder with a clamping nut or clamping sleeve as a clamping member, wherein an outer diameter of the clamping member is greater than an outer diameter of the capillary, and wherein a diameter of an interior surface of the protective device is equal to or greater than the outer diameter of the clamping member.

13. The method of claim 10, wherein moving the protective device relative to the capillary from the position protecting the capillary to the position releasing the capillary for cell manipulation comprises:
pushing the protective device over the capillary along a longitudinal axis of the capillary without contacting the capillary.

14. The method of claim 13, wherein the protective device comprises a rear wall with an opening in an axial direction of the capillary, and wherein moving the protective device relative to the capillary from the position protecting the capillary to the position releasing the capillary for cell manipulation further comprises:
guiding the protective device along the longitudinal axis of the capillary holder using the opening.

15. The method of claim 10, wherein the protective device is a protective sleeve, and wherein moving the protective device relative to the capillary from the position protecting the capillary to the position releasing the capillary for cell manipulation comprises:
folding the protective device from over the capillary between the position protecting the capillary to the position releasing the capillary for cell manipulation.

16. The method of claim 10, wherein the protective device is rotatably mounted about a horizontal axis on a carrier arm, wherein moving the protective device relative to the capillary from the position releasing the capillary for cell manipulation to the position protecting the capillary comprises:
moving the carrier arm; and
slipping the protective device over the capillary in response to moving the carrier arm.

17. The method of claim 10, wherein the capillary is mounted on a capillary adjustment, wherein the capillary adjustment is provided on an end of a swivel arm remote from a horizontal rotation axis of rotation of the swivel arm, and wherein the capillary adjustment is movable along three orthogonal working axes.

18. The method of claim 17, wherein the protective device is arranged in a stationary manner relative to the capillary adjustment and to the rotation axis of the swivel arm.

19. The method of claim 17, wherein the capillary adjustment with the working axis is arranged in a suspended manner.

20. The method of claim 10, wherein moving the protective device relative to the capillary from the position protecting the capillary to the position releasing the capillary for cell manipulation comprises:
moving the protective device using a mechanical, hydraulic, or pneumatic drive.

* * * * *